(12) United States Patent
Kim

(10) Patent No.: US 10,382,826 B2
(45) Date of Patent: Aug. 13, 2019

(54) IMAGE DISPLAY APPARATUS AND OPERATING METHOD THEREOF

(71) Applicant: SAMSUNG ELECTRONICS CO., LTD., Suwon-si, Gyeonggi-do (KR)

(72) Inventor: Moon-soo Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/794,180

(22) Filed: Oct. 26, 2017

(65) Prior Publication Data

US 2018/0124470 A1 May 3, 2018

(30) Foreign Application Priority Data

Oct. 28, 2016 (KR) .......................... 10-2016-0142148

(51) Int. Cl.
*H04N 21/462* (2011.01)
*H04N 21/482* (2011.01)
(Continued)

(52) U.S. Cl.
CPC ..... *H04N 21/4828* (2013.01); *G06F 3/04855* (2013.01); *G06F 16/74* (2019.01);
(Continued)

(58) Field of Classification Search
CPC .................................................. H04N 21/462
See application file for complete search history.

(56) References Cited

U.S. PATENT DOCUMENTS 8,595,771 B1 * 11/2013 Sharma .............. H04N 5/44543
725/37
2007/0094292 A1 4/2007 Kataoka
(Continued)

FOREIGN PATENT DOCUMENTS

EP 1 333 673 8/2003
EP 1333673 * 8/2003 ......... H04N 5/44543
(Continued)

OTHER PUBLICATIONS

Partial Search Report dated Feb. 13, 2018 in counterpart European Patent Application No. 17197976.8.
(Continued)

*Primary Examiner* — Michael H Hong
(74) *Attorney, Agent, or Firm* — Nixon & Vanderhye P.C.

(57) ABSTRACT

An image display apparatus includes: a display; a memory configured to store channel information corresponding to at least one channel; and a processor configured to execute one or more instructions stored in the memory, wherein the instructions, when executed by the processor, cause the image display device to: determine at least one preferred channel based on a search history of a keyword, when a continual channel-up command and/or a continual channel-down command is received, display, on the display, a channel scroll bar and a channel indicator configured to move along the channel scroll bar in response to the continual channel-up command or the continual channel-down command, and display channel information of the at least one preferred channel, at a position of the channel scroll bar, the position corresponding to the at least one preferred channel.

20 Claims, 14 Drawing Sheets

(51) Int. Cl.
    *G06F 16/74*         (2019.01)
    *G06F 16/78*         (2019.01)
    *G06F 3/0485*       (2013.01)
    *H04N 21/431*       (2011.01)
    *H04N 21/8405*      (2011.01)
    *H04N 21/442*       (2011.01)
    *H04N 21/45*        (2011.01)
    *H04N 21/466*       (2011.01)

(52) U.S. Cl.
    CPC ..... *G06F 16/7867* (2019.01); *H04N 21/4312* (2013.01); *H04N 21/4314* (2013.01); *H04N 21/44222* (2013.01); *H04N 21/4532* (2013.01); *H04N 21/466* (2013.01); *H04N 21/4823* (2013.01); *H04N 21/8405* (2013.01); *H04N 21/462* (2013.01)

(56) References Cited

U.S. PATENT DOCUMENTS

| | | | |
|---|---|---|---|
| 2008/0281582 A1* | 11/2008 | Hsu | G06F 17/276 704/10 |
| 2011/0060592 A1 | 3/2011 | Kang et al. | |
| 2011/0093888 A1 | 4/2011 | Araki et al. | |
| 2013/0091524 A1 | 4/2013 | Hong | |
| 2014/0195244 A1* | 7/2014 | Cha | G06F 3/167 704/270.1 |
| 2014/0333675 A1* | 11/2014 | Nakaoka | G06F 3/0485 345/684 |
| 2015/0106847 A1 | 4/2015 | Han et al. | |
| 2016/0142662 A1 | 5/2016 | Lee et al. | |
| 2017/0094355 A1* | 3/2017 | McCarty | H04N 21/4667 |

FOREIGN PATENT DOCUMENTS

| | | | |
|---|---|---|---|
| EP | 1333673 A1 * | 8/2003 | ......... H04N 5/44543 |
| EP | 1 892 956 | 8/2007 | |
| KR | 10-1995-0002438 | 3/1995 | |
| KR | 10-2000-0042731 | 7/2000 | |
| KR | 10-1047184 | 7/2011 | |
| KR | 10-1289081 | 7/2013 | |
| KR | 10-2014-0095675 | 8/2014 | |
| KR | 10-2015-0042584 | 4/2015 | |

OTHER PUBLICATIONS

Extended European Search Report for EP Application No. 17197976.8 dated May 14, 2018.

* cited by examiner

FIG. 5

| | NUMBER OF TIMES IN WHICH KEYWORD IS SEARCHED VIA SOUND | NUMBER OF TIMES IN WHICH KEYWORD IS SEARCHED VIA TEXT | PREFERENCE | PRIORITY ORDER |
|---|---|---|---|---|
| PROGRAM A | 2 | 1 | 14 | 3 |
| PROGRAM B | 3 | 0 | 20 | 1 |
| PROGRAM C | 1 | 5 | 16 | 2 |
| CHANNEL 4 | 0 | 2 | 2 | 6 |
| CHANNEL 5 | 2 | 5 | 11 | 5 |
| CHANNEL 6 | 3 | 4 | 13 | 4 |

IMAGE DISPLAY APPARATUS AND OPERATING METHOD THEREOF

CROSS-REFERENCE TO RELATED APPLICATION

This application is based on and claims priority under 35 U.S.C. § 119 to Korean Patent Application No. 10-2016-0142148, filed on Oct. 28, 2016, in the Korean Intellectual Property Office, the disclosure of which is incorporated by reference herein in its entirety.

BACKGROUND

1. Field

The present disclosure relates generally to an image display apparatus and an operating method thereof, and for example, to an image display apparatus configured to provide a user interface reflecting a preference or an interest of a user and an operating method thereof.

2. Description of Related Art

Image display apparatuses are apparatuses having functions of displaying an image that a user may view. The user may watch broadcasting channels via the image display apparatuses. The image display apparatuses display on displays thereof a broadcasting channel selected by a user from among broadcasting signals transmitted from broadcasting stations.

Also, smart televisions (TVs) configured to provide various content in addition to the broadcasting functions have been provided. The smart TVs aim to analyze and provide what users want without manipulation by the users, rather than being manually operated based on selection by the users.

Meanwhile, the image display apparatuses may provide to a user the whole program information of all the channels using a list of the channels or a program guide. In this case, the user of the image display apparatuses has to press a key of a controller several times in order to directly search for a preferred channel or program.

SUMMARY

An image display apparatus configured to determine a preferred channel of a user based on a keyword searched by the user and display information with respect to the determined preferred channel on a channel conversion interface, in order to enable the user to easily search for a desired channel, and an operating method of the image display apparatus are provided.

Additional aspects will be set forth in part in the description which follows and, in part, will be apparent from the description.

According to an aspect of an example embodiment, an image display apparatus includes: a display; a memory configured to store channel information corresponding to at least one channel; and a processor configured to execute one or more instructions stored in the memory, wherein the instructions, when executed by the processor cause the image display apparatus to determine at least one preferred channel based on a search history of a keyword, when a continual channel-up command and/or a continual channel-down command is received, to display, on the display, a channel scroll bar and a channel indicator configured to move along the channel scroll bar in response to the continual channel-up command and/or the continual channel-down command, and to display channel information for the at least one preferred channel at at least one position of the channel scroll bar corresponding to the at least one preferred channel.

According to an aspect of another example embodiment, an operating method of an image display apparatus includes: determining at least one preferred channel based on a search history of a keyword; receiving a continual channel-up command and/or a continual channel-down command; displaying, in response to the continual channel-up command and/or the continual channel-down command, a channel scroll bar and a channel indicator which moves along the channel scroll bar corresponding to the continual channel-up command and/or the continual channel-down command; and displaying channel information for the at least one preferred channel at at least one position of the channel scroll bar corresponding to the at least one preferred channel.

According to an aspect of another example embodiment, a non-transitory computer-readable recording medium has recorded thereon a program for executing the operating method of an image display apparatus.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 5 is a diagram illustrating an example method performed by an image display apparatus to determine a preferred channel, according to an example embodiment;

DETAILED DESCRIPTION

Figure 1:
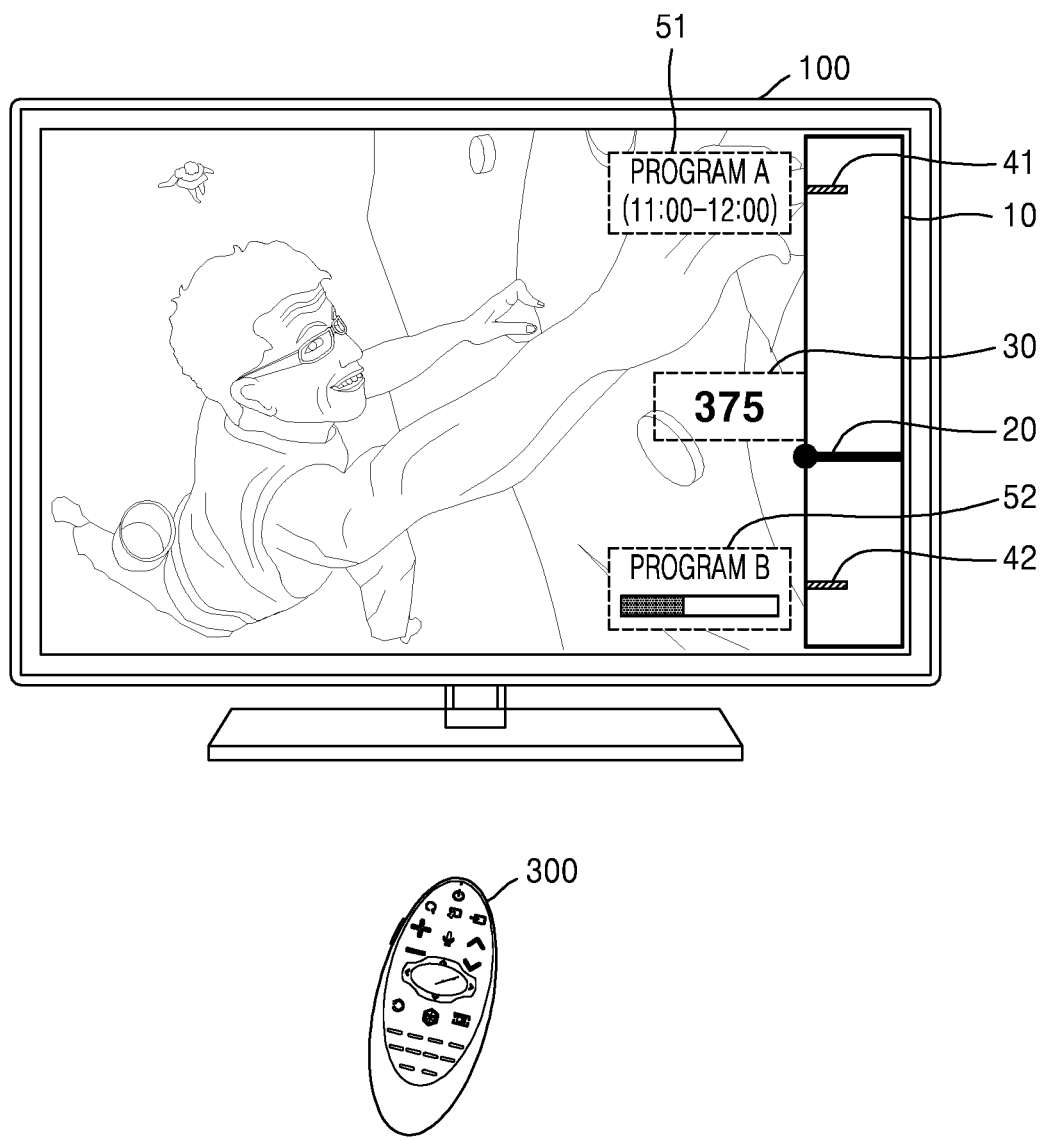
FIG. 1 is a diagram illustrating an example image display apparatus and a control device according to an example embodiment.

Terms used in this disclosure will be briefly described, and then, the present disclosure will be described in greater detail.

The terms used herein are general terms that have been widely used in the technical art to which the present disclosure pertains. However, the terms may vary by reflecting intentions of technicians in this art, precedents, or new technologies. Also, some of the terms used herein may be arbitrarily chosen. In this case, these terms are defined in detail below. Accordingly, the specific terms used herein should be understood based on the unique meanings thereof and the whole context of the present disclosure.

It will be further understood that when a part "includes" or "comprises" an element, unless otherwise defined, the part may further include other elements, not excluding the other elements. Also, the terms, such as "unit" or "module," should be understood as a unit that processes at least one function or operation and that may be embodied in a hardware manner, a software manner, or a combination of the hardware manner and the software manner.

Hereinafter, the present disclosure will be described in greater detail with reference to the accompanying drawings to convey the concept of the present disclosure to one of ordinary skill in the art. The present disclosure may, however, be embodied in many different forms and should not be understood as being limited to the various example embodiments set forth herein. In the drawings, detailed descriptions about related well known functions or configurations that may blur the points of the present disclosure may be omitted, and like reference numerals denote like elements. Expressions such as "at least one of," when preceding a list of elements, modify the entire list of elements and do not modify the individual elements of the list.

FIG. 1 is a diagram illustrating an example image display apparatus 100 and a control device (e.g., a remote controller) 300 according to an example embodiment.

As illustrated in FIG. 1, the image display apparatus 100 may, for example, be a television (TV). However, it is not limited thereto, and the image display apparatus 100 may be implemented as electronic devices configured to receive broadcasting signals and display an image based on the broadcasting signals. For example, the image display apparatus 100 may include, without limitation, various electronic devices, such as cellular phones, tablet personal computers (PCs), digital cameras, camcorders, laptop computers, desktop computers, electronic book terminals, digital broadcasting terminals, personal digital assistants (PDAs), portable multimedia players (PMPs), navigation devices, MP3 players, wearable devices, or the like. In particular, embodiments may be easily implemented by a display apparatus having a large display, such as a TV, but are not limited thereto.

The image display apparatus 100 may be stationary or mobile, and may be a digital broadcasting receiver capable of receiving digital broadcasting. Also, the image display apparatus 100 may be implemented not only as a flat display apparatus, but also as a curved display apparatus with a screen having a curvature or a flexible display apparatus having an adjustable curvature. An output resolution of the image display apparatus 100 may include, for example, and without limitation, high definition (HD), full HD, ultra HD, or a greater resolution than the ultra HD, or the like.

The control device 300 may be implemented as various types of devices configured to control the image display apparatus 100, such as, for example, and without limitation, a remote controller or a cellular phone, or the like. Also, the control device 300 may control the image display apparatus 100 via near-field communication, such as infrared communication or Bluetooth communication. The control device 300 may control functions of the image display apparatus 100 by using, for example, and without limitation, at least one of keys (a hard key button, a soft key, a scroll wheel, etc.) a touch pad, a microphone (not shown) capable of receiving a voice of a user, and a sensor (not shown) capable of recognizing a motion of the control device 300, or the like, which are provided in the control device 300.

The control device 300 may include a channel-up key or a channel-down key for changing a channel of the image display apparatus 100. Also, the channel-up key or the channel-down key may, for example, be implemented as a hard key button, a soft key, a scroll wheel, or the like. When the image display apparatus 100 receives an input of the channel-up key or the channel-down key, the image display apparatus 100 may convert a present channel to a previous channel or a next channel.

Meanwhile, the term "user" in this disclosure may refer, for example, to a person for controlling functions or operations of the image display apparatus 100 using the control device 300, and may include a viewer, a manager, an installation technician, or the like.

The image display apparatus 100 may display a channel scroll bar 10 and a channel indicator 20 on a display. The channel scroll bar 10 may include a plurality of points to which the channel indicator 20 may move, and the plurality of points may respectively correspond to the whole channels stored in the image display apparatus 100.

It is illustrated in FIG. 1 that the channel scroll bar 10 may, for example, have a form of a vertical scroll bar displayed on a right side of the display. However, the channel scroll bar 10 is not limited thereto. The channel scroll bar 10 may be displayed on a left side, an upper side, or a bottom side of the display, and may have a form of a horizontal scroll bar. Also, the channel indicator 20 may be displayed on the channel scroll bar 10 and may indicate a location of a channel corresponding to channel information 30 displayed on the display, from among the whole channels. The image display apparatus 100 may display, on the display, the channel information 30 with respect to the channel corresponding to a point of the channel scroll bar 10, at which the channel indicator 20 is located. The channel information 30 may include a channel title of the channel, a name of a broadcasting company providing the channel, a channel number of the channel, a type of content corresponding to the channel, a content title of the content, etc.

The image display apparatus 100 according to an embodiment may determine at least one preferred channel, based on a search history of a keyword of a user.

The image display apparatus 100 according to an embodiment may display a point from among the plurality of points of the channel scroll bar 10, the point corresponding to the preferred channel of the user. For example, as illustrated in FIG. 1, the image display apparatus 100 may display a first object 41 indicating a point corresponding to a first preferred channel and a second object 42 indicating a point corresponding to a second preferred channel.

Also, the image display apparatus 100 may display channel information with respect to the preferred channel. For example, the image display apparatus 100 may display channel information 51 with respect to the first preferred channel. Here, the channel information 51 with respect to the first preferred channel may include a title of content (for example, program A) provided by the first preferred channel and a schedule of the content (for example, 11:00-12:00) including start and end times of the content. Also, the image display apparatus 100 may display channel information 52 with respect to the second preferred channel. Here, the channel information 52 with respect to the second preferred channel may include a title of content (for example, program B) provided by the second preferred channel and a time line indicating a present playing point of the content (for example, a position of the present playing point in a whole playing time of the program). However, the channel information 51 and the channel information 52 are not limited thereto.

The image display apparatus 100 may move the channel indicator 20 on the channel scroll bar 10 in a first direction or a second direction, in response to a long press input of the channel-up key or the channel-down key included in the control device 300. Here, the long press input refers, for example, to an input of pressing a key and maintaining the pressing of the key for a period of time that is equal to or greater than a critical period of time. For example, the long press input may refer, for example, to an input whereby a difference between a point of time at which a key is pressed and a point of time at which the key is released is equal to or greater than a critical period of time.

For example, when the channel scroll bar 10 is a vertical scroll bar as illustrated in FIG. 1, the image display apparatus 100 may move the channel indicator 20 upwards in response to the long press input of the channel-up key and move the channel indicator 20 downwards in response to the long press input of the channel-down key. However, it is not limited thereto. Also, the image display apparatus 100 may display, on the display, the channel information 30 with respect to a channel corresponding to a point of the channel scroll bar 10, to which the channel indicator 20 is moved.

Figure 2:
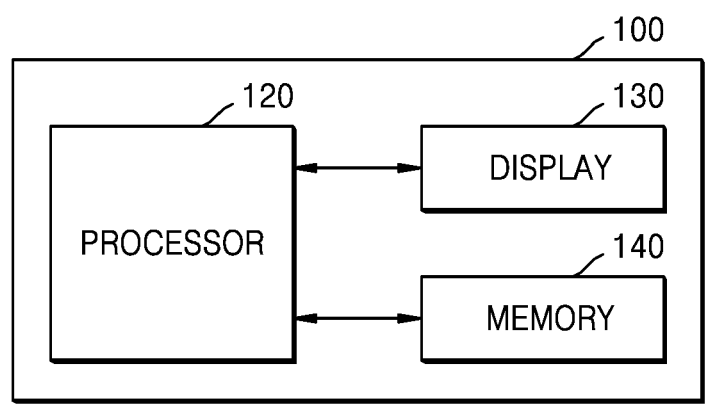
FIG. 2 is a block diagram illustrating an example structure of an image display apparatus according to an example embodiment.

FIG. 2 is a block diagram illustrating an example structure of the image display apparatus 100 according to an example embodiment.

Referring to FIG. 2, the image display apparatus 100 according to an embodiment may include a processor (e.g., including processing circuitry) 120, a display 130, and a memory 140.

The display 130 according to an embodiment may generate a driving signal by converting an image signal, a data signal, an on screen display (OSD) signal, a control signal, etc. processed by the processor 120. The display 130 may be implemented as a plasma display panel (PDP), a liquid crystal display (LCD), an organic light-emitting display (OLED), a flexible display, or the like, but is not limited thereto, and may be implemented as a three-dimensional (3D) display. Also, the display 130 may be implemented as a touch screen to be used not only as an output device, but also as an input device.

The display 130 according to an embodiment may display a channel scroll bar and a channel indicator. The display 130 may display a point from among a plurality of points of the channel scroll bar, the point corresponding to a preferred channel, and channel information with respect to the preferred channel. Also, the display 130 may display channel information with respect to a channel corresponding to a point of the channel scroll bar, at which the channel indicator is located.

The processor 120 according to an embodiment may execute one or more programs stored in the memory 140. The processor 120 may include various processing circuitry and may include, for example, and without limitation a single-core processor, a dual-core processor, a triple-core processor, a quad-core processor, and a multiple-core processor. Also, the processor 120 may include a plurality of processors. For example, the processor 120 may include a main processor (not shown) and a sub-processor (not shown) operating in a sleep mode.

The memory 140 according to an embodiment may store various data, programs, or applications for driving and controlling the image display apparatus 100.

The memory 140 according to an embodiment may store at least one channel and channel information corresponding to the at least one channel. Here, the at least one channel may include a valid channel. The valid channel may refer, for example, to a channel, a broadcasting signal of which may be received by the image display apparatus 100. Also, the image display apparatus 100 may periodically update the channel information stored to the memory 140.

The programs stored to the memory 140 may include one or more instructions. The programs (the one or more instructions) or the applications stored in the memory 140 may be executed by the processor 120.

The processor 120 according to an embodiment may, for example, and without limitation, determine a preferred channel based on a search history of a keyword of a user. Here, the keyword may be input via text or sound. When the sound is received, the processor 120 may recognize the received sound and convert the received sound into text (for example, words, sentences, etc.) corresponding thereto. However, it is not limited thereto.

Also, the keyword searched by the user may include a content title (for example, a title of a program), a channel title, a broadcasting company providing a channel, a channel number, or the like, but is not limited thereto. The processor 120 may determine a channel corresponding to the keyword as the preferred channel, based on a frequency at which the keyword is searched. For example, when the searched keyword is a content title, the processor 120 may determine a channel providing content corresponding to the content title as the preferred channel, and when the searched keyword is a channel title, a broadcasting company providing a channel, or a channel number, the processor 120 may determine a channel corresponding thereto as the preferred channel.

The processor 120 may, for example, determine the preferred channel by applying a weight to the frequency at which the keyword is searched, based on at least one of a type of the keyword and a method of inputting the keyword. For example, the processor 120 may determine the preferred channel by applying a greater weight to the frequency at which the keyword indicating content is searched than the frequency at which the keyword indicating a channel is searched, and by applying a greater weight to the frequency at which the keyword input via sound is searched than the frequency at which the keyword input via text is searched. However, it is not limited thereto.

Also, the processor 120 may determine a priority order of channels corresponding to keywords based on frequencies at which the keywords are searched, and may determine a predetermined number of channels having high priority orders as preferred channels.

Figure 3:
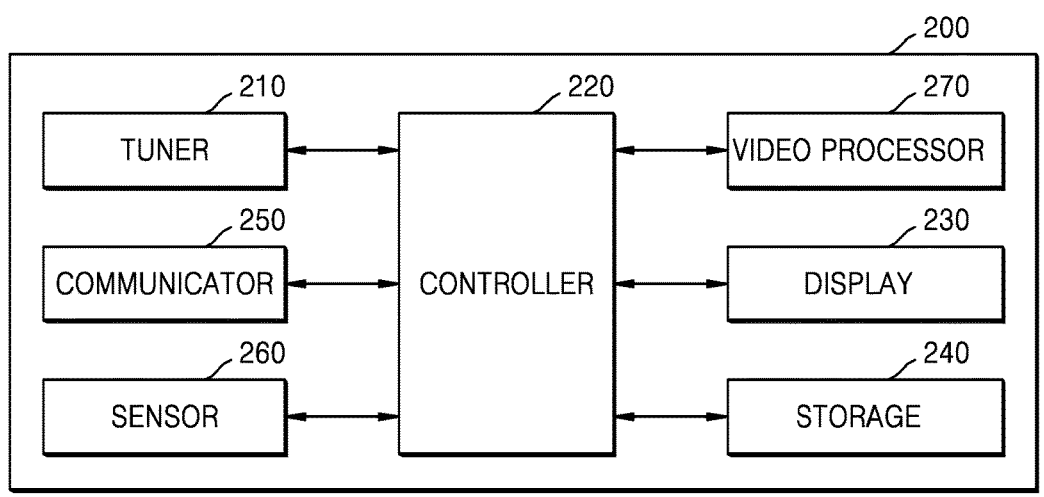
FIG. 3 is a block diagram illustrating an example structure of an image display apparatus according to another example embodiment.

FIG. 3 is a block diagram illustrating an example structure of an image display apparatus 200 according to another example embodiment. The image display apparatus 200 of FIG. 3 may be an embodiment of the image display apparatus 100 of FIG. 1.

Referring to FIG. 3, the image display apparatus 200 according to an embodiment may include a tuner 210, a controller (e.g., including processing circuitry) 220, a display 230, a communicator (e.g., including communication circuitry) 250, a sensor 260, a video processor (e.g., including video processing circuitry) 270, and a storage 240.

The processor 120 of FIG. 2 may correspond to the controller 220 of FIG. 3, the memory 140 of FIG. 2 may correspond to the storage 240 of FIG. 3, and the display 130 of FIG. 2 may correspond to the display 230 of FIG. 3. Aspects that are the same as the aspects described with reference to FIG. 2 will not be repeated with reference to FIG. 3.

The communicator 250 may include various communication circuitry and transmit and receive data or a signal to and from an external device or a server, under control of the controller 220. The controller 220 may transmit and receive content to and from the external device connected via the communicator 250, download an application from the external device, or perform web-browsing. The communicator 250 may, for example, and without limitation, transmit and receive the data or the signal via at least one of wireless LAN (for example, Wi-fi), Bluetooth, and Ethernet, based on the performance and the structure of the image display apparatus 200.

The tuner 210 may tune and select only a frequency corresponding to a channel that is to be received by the image display apparatus 100, from among a number of electromagnetic waves, by performing amplification, mixing, resonance, etc. on a broadcasting signal received via wires or wirelessly. The broadcasting signal may include audio, video, and additional information (for example, an electronic program guide (EPG)).

The tuner 210 may receive the broadcasting signal in a frequency zone corresponding to a channel number, based on a user's input (for example, a control signal received from the control device 300, such as an input of a channel number, an input of channel up or channel down, an input of a channel on an EPG screen).

The tuner 210 may receive the broadcasting signal from various sources, such as, for example, and without limitation, terrestrial broadcasting, cable broadcasting, satellite broadcasting, internet broadcasting, or the like. The tuner 210 may receive the broadcasting signal from sources, such as analogue broadcasting or digital broadcasting.

The video processor 270 may include various circuitry to process video data received by the image display apparatus 200. The video processor 270 may perform various types of image processing, such as, for example, and without limitation, decoding, scaling, noise filtering, frame rate conversion, resolution conversion, or the like, with respect to the video data.

The sensor 260 may receive an optical signal (including the control signal) from an external control device, via a light window (not shown) of a bezel of the display 220. The sensor 260 may receive the optical signal corresponding to a user's input (for example, touching, pressing, a touching gesture, a voice, or a motion) from the external control device. The controller 210 may extract the control signal from the received optical signal. Also, the sensor 260 may sense a voice, an image, or an interaction of the user. The sensor 260 according to an embodiment may include a microphone for receiving a voice uttered by the user. The microphone may convert the received voice into an electrical signal and output the electrical signal via the controller 220.

Also, the sensor 260 according to an embodiment may sense the user's input and transmit the sensed signal to the controller 220. The sensor 260 may sense the user's input of channel up or down, power on or off, channel selection, screen setting, or the like from the control device 300. Also, the sensor 260 according to an embodiment may sense an input of pressing a channel-up key or a channel-down key included in the control device 300, a long press input of the channel-up key or the channel-down key, an input of releasing the channel-up key or the channel-down key, etc.

The sensor 260 may sense a continual channel-up command or a continual channel-down command. The continual channel-up command or the continual channel-down command may include the input of pressing the channel-up key or the channel-down key, and the long press input of the channel-up key or the channel-down key, wherein the channel-up key and the channel-down key are included in the control device 300.

The controller 220 may include various processing circuitry and control general operations of the image display apparatus 200 and signal flows between the components of the image display apparatus 200, and may process data. The controller 220 may execute an operation system (OS) stored in the storage 240 and various applications, when a user's input is received or a predetermined condition that is stored is satisfied.

The storage 240 may store various data, programs, or applications for driving and controlling the image display apparatus 200, under control of the controller 220. The storage 240 may include a broadcasting receiving module, a channel control module, a volume control module, a communication control module, a voice recognition module, a motion recognition module, a light receiving module, a display control module, an audio control module, an external input control module, a power control module, a power control module of an external device connected wirelessly (for example, via Bluetooth), a sound database (DB), or a motion database (DB), which are not illustrated. The modules and the databases of the storage 240, which are not illustrated, may be implemented as software to perform a function of controlling broadcasting reception, a function of controlling a channel, a function of controlling a volume, a function of controlling communication, a function of sound recognition, a function of motion recognition, a function of controlling light reception, a function of controlling a display, a function of controlling an audio, a function of controlling an external input, a function of controlling power, or a function of controlling power of the external device connected wirelessly (for example, via Bluetooth). The controller 220 may perform each of the functions using corresponding software that is stored.

The block diagrams of the image display apparatuses 100 and 200 illustrated in FIGS. 2 and 3 illustrate various example embodiments. The components of the block diagrams 100 and 200 may be integrated, added, or omitted according to specifications of the image display apparatuses 100 and 200 which are actually implemented. That is, two or more components may be integrated as one component, or one component may be divided into two or more components, according to necessity. Also, functions performed in each block diagram are described according to the embodiments, and their detailed operations or devices for performing the functions do not limit the scope of the claims of the present disclosure.

Figure 4:
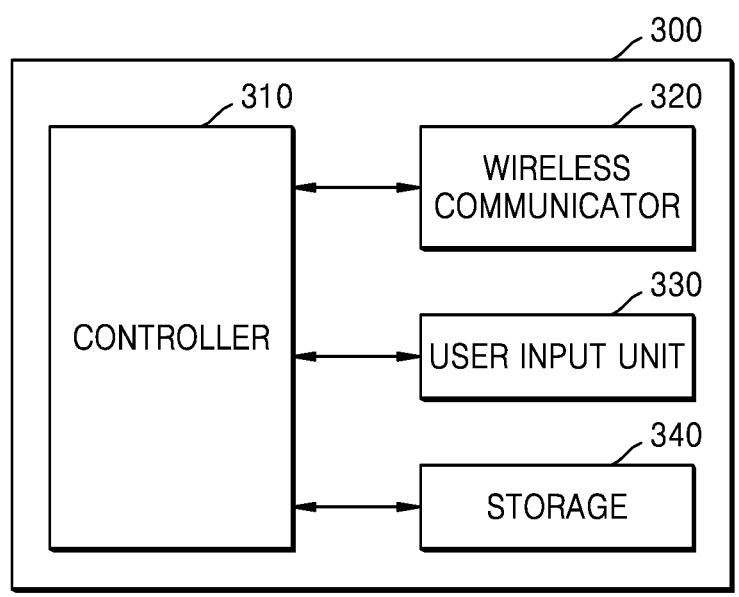
FIG. 4 is a block diagram illustrating an example structure of a control device according to an example embodiment.

FIG. 4 is a block diagram illustrating an example structure of the control device 300 according to an example embodiment.

Referring to FIG. 4, the control device (e.g., a remote controller) 300 may include a controller (e.g., including processing circuitry) 310, a wireless communicator (e.g., including wireless communication circuitry) 320, a user input unit (e.g., including input circuitry) 330, and a storage 340.

The wireless communicator 320 may include various wireless communication circuitry and transmit and receive a signal to and from any one of the image display apparatuses 100 and 200 described according to the example embodiments. The wireless communicator 320 may include, for example, and without limitation, a radio frequency (RF) module for transmitting and receiving a signal to and from the image display apparatus 100 according to the RF communication standards. Also, the control device 300 may include an infrared (IR) module for transmitting and receiving a signal to and from the image display apparatus 100 according to the IR communication standards.

The control device 300 may transmit a command with respect to power on or off, channel adjustment, volume adjustment, or the like, to the image display apparatus 100, via the IR module, according to necessity.

The user input unit 330 may include various input circuitry, such as, for example, and without limitation, a keypad, a button, a touch pad, or a touch screen. A user may manipulate the user input unit 330 to send an input of a command with respect to the image display apparatus 100 to the control device 300. When the user input unit 330 includes a hard key button, the user may send the input of the command with respect to the image display apparatus 100 to the control device 300, by pressing the hard key button. When the user input unit 330 includes a touch screen, the user may send the input of the command with respect to the image display apparatus 100 to the control device 300, by touching a soft key of the touch screen. For example, the user input unit 330 may include a channel-up key or a channel-down key to adjust a channel. Also, the channel-up key or the channel-down key may include a hard key button, a soft key, a scroll wheel, etc. Also, the user input unit 330 may include various types of input devices which may be manipulated by a user, such as a scroll key, a jog key, etc.

When the channel-up key or the channel-down key includes the scroll wheel, a continual scroll-up input of moving the scroll wheel upwards, which is performed by a number of times that is equal to greater than a predetermined number of times, or a continual scroll-down input of moving the scroll wheel downwards, which is performed by a number of times that is equal to greater than a predetermined number of times, may correspond to a long press input of the channel-up key or a long press input of the channel-down key according to an embodiment. Also, when, after the continual scroll-up input or the continual scroll-down input, there is no scroll input for a predetermined period of time, it may correspond to an input of releasing the channel-up key or an input of releasing the channel-down key according to an embodiment.

Also, the user input unit 330 may, for example, include a touch pad. The user input unit 330 according to an embodiment may receive a user's input of dragging, touching, or flipping, via the touch pad of the control device 300. Also, the image display apparatus 100 may be controlled according to a type (for example, a direction in which a drag command is input, a time at which a touch command is input) of the received user's input.

For example, the input of a dragging gesture on the touch pad may correspond to the long press input of the channel-up key or the long press input of the channel-down key according to an embodiment, and the input of releasing a touch device from the touch pad after the dragging gesture on the touch pad may correspond to the input of releasing the channel-up key or the input of releasing the channel-down key according to an embodiment.

The storage 340 may store various types of programs, applications, and data which are necessary for controlling or operating the control device 300.

The controller 310 may control general operations related to the controlling of the control device 300. The controller 310 may transmit a signal corresponding to a manipulation of a predetermined key of the user input unit 330 or a signal corresponding to a motion of the control device 300 to the image display apparatus 100 via the wireless communicator 320.

Also, the signal transmitted by the control device 300, which is sensed by the sensor 260, may be transmitted to the controller 220 of the image display apparatus 200. The controller 220 may determine information with respect to the operation and the key manipulation of the control device 300 from the signal transmitted by the control device 300 and may control the image display apparatus 200 in correspondence thereto.

When the channel-up key or the channel-down key is pressed for a period of time that is equal to or greater than a predetermined period of time, the control device 300 according to an embodiment may continually transmit a channel-up command or a channel-down command to the image display apparatus 100 with a certain time interval, or may transmit a continual channel-up command or a continual channel-down command to the image display apparatus 100, wherein the continual channel-up command or the continual channel-down command are distinguished from a singular channel-up command or a singular channel-down command. Also, when the pressing of the channel-up key or the pressing of the channel-down key is released, the image display apparatus 100 may stop the channel-up operation or the channel-down operation.

FIG. 5 is a diagram illustrating an example method performed by the image display apparatus 100 to determine a preferred channel, according to an example embodiment.

The image display apparatus 100 according to an embodiment may determine a channel corresponding to a keyword as the preferred channel, based on a frequency at which the keyword is searched. For example, the image display apparatus 100 may count the number of times in which each keyword is searched for a predetermined period of time, and when the number of times in which a keyword is searched is equal to or greater than a predetermined number of times, may determine a channel corresponding to the keyword as the preferred channel.

Alternatively, the image display apparatus 100 according to an embodiment may determine the preferred channel by differently applying a weight to the frequency at which a keyword is searched, based on a method of inputting the keyword or a type of the keyword. For example, a first keyword (program A), a second keyword (program B), a third keyword (program C), a fourth keyword (channel 4), a fifth keyword (channel 5), and a sixth keyword (channel 6) may be searched by the image display apparatus 100 during a predetermined period of time. Here, the first through third keywords (program A, program B, and program C) may be the keywords indicating content (for example, titles of the content), and the fourth through sixth keywords (channel 4, channel 5, and channel 6) may be the keywords indicating channels (for example, titles of the channels, numbers of the channels, names of broadcasting companies, etc.). Also, the first through sixth keywords may be input via sound or text, but are not limited thereto.

The image display apparatus 100 according to an embodiment may determine the preferred channel by applying different weights to the number of times in which the keyword is searched via sound and the number of times in which the keyword is searched via text. For example, the image display apparatus 100 may apply a first weight to the number of times in which the keyword is searched via sound, and may apply a second weight to the number of times in which the keyword is searched via text, wherein the first weight may be greater than the second weight.

Also, the image display apparatus 100 according to an embodiment may determine the preferred channel by applying different weights to the number of times in which the keyword indicating content is searched and the number of times in which the keyword indicating a channel is searched. For example, the image display apparatus 100 may apply a third weight to the number of times in which the keyword indicating content is searched, and may apply a fourth weight to the number of times in which the keyword indicating a channel is searched, wherein the third weight may be greater than the fourth weight.

The image display apparatus 100 may calculate (determine) a preference by applying the weights to the number of times in which each keyword is searched. For example, the preference of the first keyword may be calculated as the third weight*{the first weight*the number of times in which the keyword is searched via sound+the second weight*the number of times in which the keyword is searched via text}, and the preference of the fourth keyword may be calculated as the fourth weight*{the first weight*the number of times in which the keyword is searched via sound+the second weight*the number of times in which the keyword is searched via text}. However, this is only an embodiment, and the preference of the keyword may be calculated by using various algorithms.

Also, the image display apparatus 100 may determine a priority order of channels corresponding to the keywords, based on the preferences of the keywords. Here, the priority order determined by the image display apparatus 100 may increase as the preferences increase.

The image display apparatus 100 according to an embodiment may determine a predetermined number of channels having high priority orders as the preferred channel, based on the preferences of the keywords corresponding to the channels. For example, the image display apparatus 100 may determine channel 2 (a channel providing program B), channel 3 (a channel providing program C), and channel 4 (a channel providing program A) corresponding to first through third orders, respectively, as the preferred channel. However, the present disclosure is not limited thereto.

Also, the image display apparatus 100 according to an embodiment may determine the preferred channel based on data of a viewing history of a user. For example, the image display apparatus 100 may count the number of times in which the user views content or a channel during a predetermined period of. When the number of times in which the user views the content or the channel during the predetermined period of time is equal to or greater than a predetermined number of times, the image display apparatus 100 may determine a channel providing the content or the corresponding channel as the preferred channel. Here, the image display apparatus 100 may determine the preferred channel by applying different weights to the number of times in which the user views the content and the number of times in which the user views the channel. Also, the image display apparatus 100 may determine the preferred channel by considering viewing time along with the number of times in which the user views the content or the channel.

Alternatively, the image display apparatus 100 according to an embodiment may determine the preferred channel based on data on ratings. For example, the image display apparatus 100 may determine a channel providing content having ratings equal to or greater than a predetermined value as the preferred channel. However, the present disclosure is not limited thereto.

FIGS. 6A, 6B, 6C, 6D and 6E are diagrams illustrating examples of a screen displayed on the image display apparatus 100 according to an example embodiment.

Figure 6A:
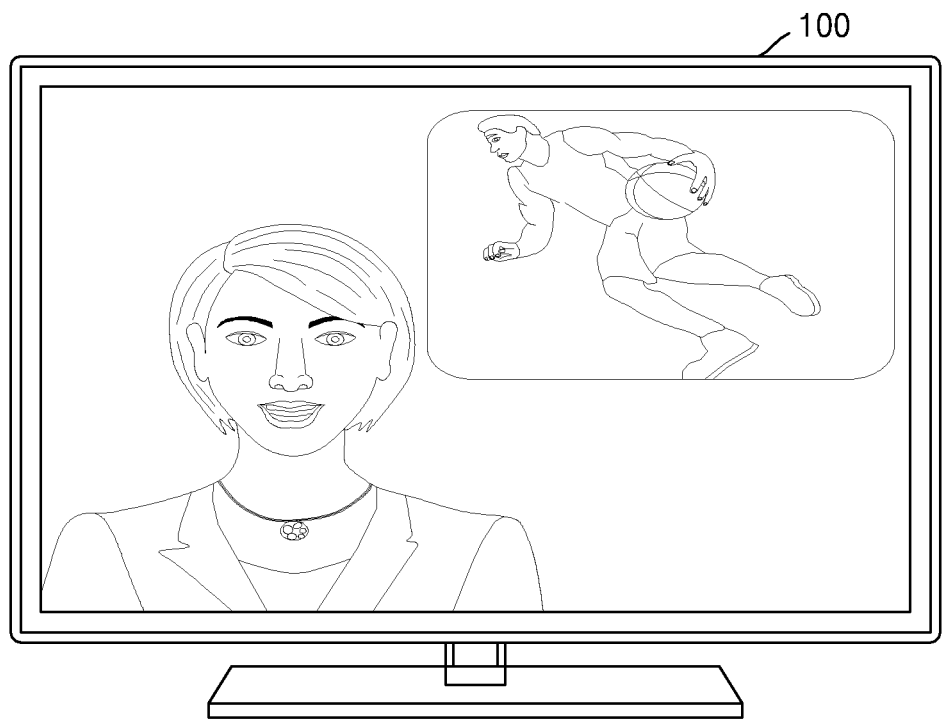
FIGS. 6A, 6B, 6C, 6D and 6E are diagrams illustrating examples of a screen displayed on an image display apparatus according to an example embodiment.
Figure 6A:
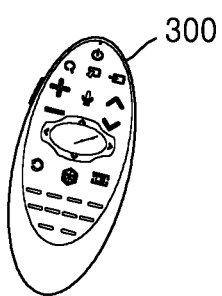

Referring to FIG. 6A, the image display apparatus 100 according to an embodiment may receive a control signal from the control device 300 and may be controlled based on the received control signal.

The control device 300 according to an embodiment may transmit and receive a signal to and from the image display apparatus 100, according to the IR or the RF communication standards. However, the present disclosure is not limited thereto. Also, the control device 300 may include a channel-up key or a channel-down key. The channel-up key or the channel-down key may be provided as a hard key button or a soft key. Alternatively, the channel-up key or the channel-down key may be provided as a scroll wheel.

A user may manipulate a key of the control device 300 to send an input of a command with respect to the image display apparatus 100 to the control device 300. For example, the user may press the channel-up key or the channel-down key or touch the channel-up key or the channel-down key to send the input of the command (for example, a command to convert a present channel to a next channel or a previous channel) with respect to the image display apparatus 100 to the control device 300.

Figure 6B:
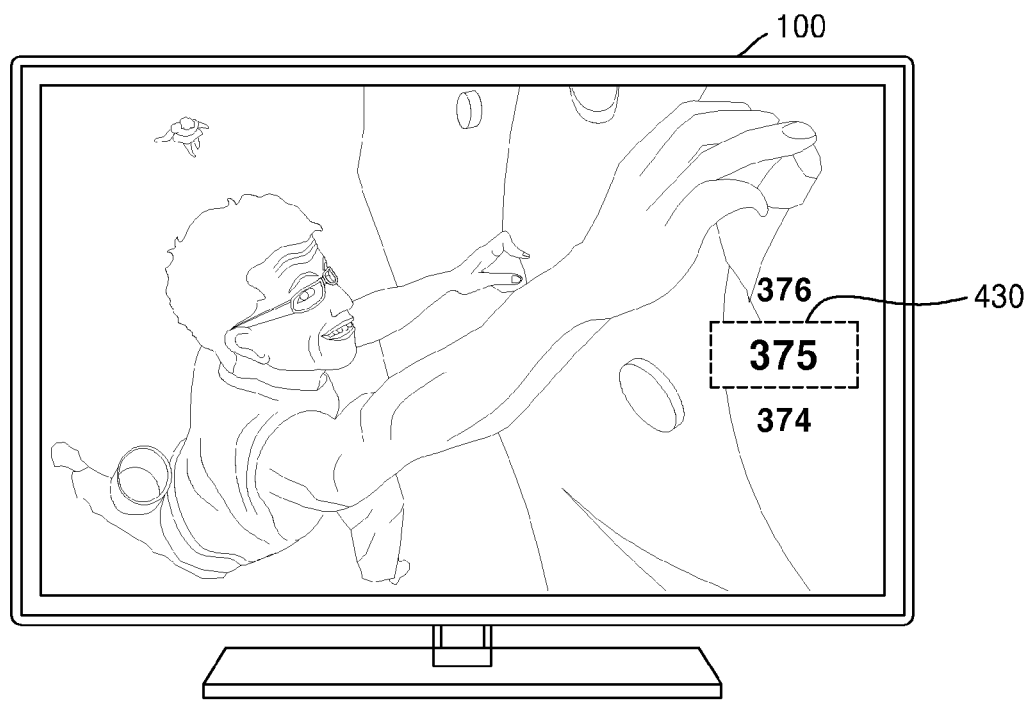
Figure 6B:
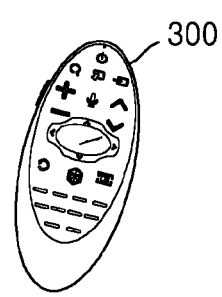

The control device 300 may transmit a control signal corresponding to the user's command to the image display apparatus 100, and the image display apparatus 100 may convert the present channel to the next channel or the previous channel in correspondence to the control signal. For example, as illustrated in FIG. 6A, the image display apparatus 100 may receive a signal of an input of the channel-up key from the control device 300, while the image display apparatus 100 displays an image with respect to the present channel (for example, channel 374). When the image display apparatus 100 receives the signal of the input of the channel-up key, the image display apparatus 100 may convert the present channel (for example, channel 374) to the next channel (for example, channel 375) as illustrated in FIG. 6B. The image display apparatus 100 may receive a broadcasting signal corresponding to the next channel (for example, channel 375) and display an image corresponding to the next channel (for example, channel 375) on a display. Also, when the image display apparatus 100 receives a signal of an input of the channel-down key, the image display apparatus 100 may convert the present channel to the previous channel.

Also, the image display apparatus 100 may display channel information corresponding to the channel to which the present channel is converted. For example, as illustrated in FIG. 6B, the image display apparatus 100 may display channel information including a channel number 430 (for example, '375') of the channel to which the present channel is converted, and may also display a channel number (for example, "374") of the channel which is converted or a channel number (for example, "376") of a channel next to the channel to which the present channel is converted.

Also, the image display apparatus 100 may end the display of the channel information, when an input is not received for a predetermined period of time after the channel is converted.

Figure 6C:
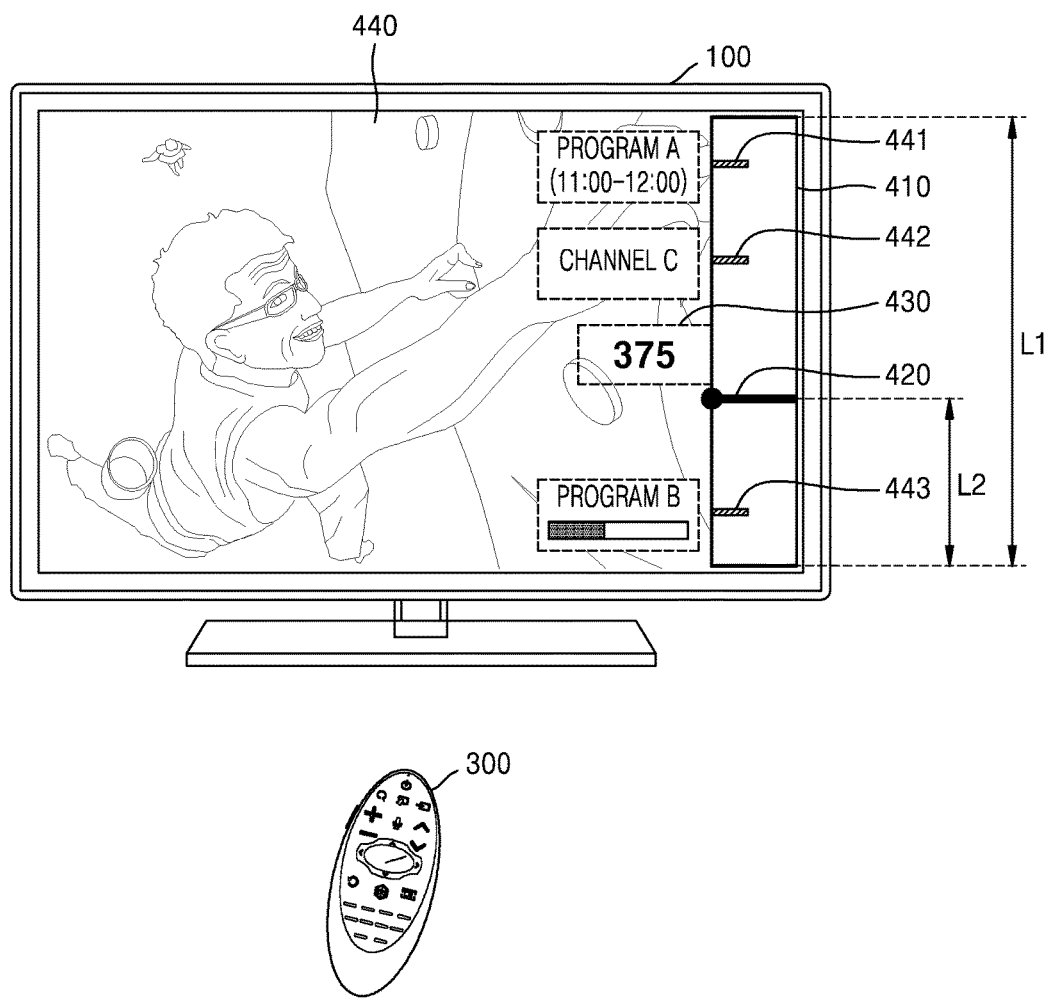

Meanwhile, when the image display apparatus 100 according to an embodiment continually receives a channel-up or a channel-down command, the image display apparatus 100 may display a channel scroll bar 410 and a channel indicator 420. For example, when the image display apparatus 100 receives from the control device 300 a signal of a long press input of the channel-up key or a signal of a long press input of the channel-down key, the image display apparatus 100 may display the channel scroll bar 410 and the channel indicator 420 as illustrated in FIG. 6C. Alternatively, when the image display apparatus 100 receives from the control device 300 a signal of an input of continually pressing the channel-up key or the channel-down key by a number of times that is equal to or greater than a predetermined number of times, the image display apparatus 100 may display the channel scroll bar 410 and the channel indicator 420. Alternatively, when the image display apparatus 100 receives an input of a predetermined key, the image display apparatus 100 may display the channel scroll bar 410 and the channel indicator 420. However, the present disclosure is not limited thereto.

In FIG. 6C, it is illustrated that the channel scroll bar 410 is indicated as a vertical scroll bar on the right side of the display. However, the channel scroll bar 410 is not limited thereto, and the channel scroll bar 410 may be indicated on the left side, the upper side, or the bottom side of the display, and may be indicated as a horizontal scroll bar. Also, the channel indicator 420 may be indicated on the channel scroll bar 410.

Also, the channel scroll bar 410 may include a plurality of points to which the channel indicator 420 may move. The plurality of points may correspond to a plurality of channels stored in the image display apparatus 100, respectively. For example, when the whole channels stored in the image display apparatus 100 correspond to 1000 channels including channel 1 through channel 1000, the channel scroll bar 410 may include $1^{st}$ through $1000^{th}$ points. Here, distances between adjacent points may be identical.

The image display apparatus 100 may determine a channel corresponding to a point of the channel scroll bar 410, at which the channel indicator 420 is located, and display the channel information 430 corresponding to the determined channel on the display. Here, the image display apparatus 100 may determine the channel corresponding to the point of the channel scroll bar 410, at which the channel indicator 420 is located, based on a relative location of the channel indicator 420 on the channel scroll bar 410. For example, when a ratio L2/L1 of a distance L2 between a start point of the channel scroll bar 410 and a point of the channel scroll bar 410, at which the channel indicator 420 is located, to a total size L1 of the channel scroll bar 410, is 0.375, the image display apparatus 100 may determine a 375th channel from among the whole 1000 channels, as the channel corresponding to the point of the channel scroll bar 410, at which the channel indicator 420 is located. Also, the image display apparatus 100 may display on the display the channel information 430 (for example, a channel number, "375") with respect to the 375th channel.

The image display apparatus 100 may display a point from among the plurality of points of the channel scroll bar 410, which corresponds to the preferred channel, and the channel information 430 with respect to the preferred channel.

The image display apparatus 100 may determine the preferred channel by using the method described with reference to FIG. 5, and may display the determined preferred channel on the channel scroll bar 410. For example, the image display apparatus 100 may display a point corresponding to the preferred channel, from among the plurality of points. The image display apparatus 100 may display specific objects 441, 442, and 443 on the points of the channel scroll bar 410, which correspond to the preferred channels, as illustrated in FIG. 6C.

Also, the image display apparatus 100 may display a predetermined number of preferred channels. For example, the image display apparatus 100 may determine a priority order of channels corresponding to keywords based on frequencies at which the keywords are searched, and may display the predetermined number of preferred channels having high priority orders.

Alternatively, when a program corresponding to the searched keyword is currently broadcast or is to be broadcast in a predetermined period of time, the image display apparatus 100 may display the preferred channels corresponding to the program. However, the present disclosure is not limited thereto.

Also, the image display apparatus 100 may display the channel information 430 with respect to the preferred channel. The image display apparatus 100 may display a channel title of the preferred channel, a channel number of the preferred channel, a name of a broadcasting company, a content title of content (a program) provided by the preferred channel, schedule information of the content (start time and end time of the content), etc. For example, as illustrated in FIG. 6C, the image display apparatus 100 may display the program title (program A) of a program broadcast in a first preferred channel and the broadcasting time (11:00-12:00) of program A. Also, the image display apparatus 100 may display the channel title of a second preferred channel, and may display a time line indicating a present point of a program that is being broadcast in a third preferred channel, with respect to the whole broadcasting time of the program. However, the present disclosure is not limited thereto.

Meanwhile, the channel indicator 420 indicated on the channel scroll bar 410 may indicate a position of a channel corresponding to the channel information 430 displayed on the display, from among the whole channels. For example, the whole size L1 of the channel scroll bar 410 may correspond to the total number of channels stored in the image display apparatus 100 and the distance L2 between a start point of the channel scroll bar 410 and a point of the channel scroll bar 410, at which the channel indicator 420 is located, may correspond to an order of the channel from among the whole channels, which corresponds to the channel information 430.

For example, when the channel information 430 (for example, a channel corresponding to the channel number "375") displayed on the display corresponds to the 375th channel from among the whole channels including $1^{st}$ through 1000th channels, as illustrated in FIG. 6C, L2/L1 may be 0.375. Also, the point of the channel scroll bar 410, at which the channel indicator 420 is located, may be the 375th point from among the $1^{st}$ through 1000th points.

A user may easily select a channel to view, based on the channel information with respect to the preferred channel, which is displayed on the channel scroll bar 410. For example, when the user wishes to view program A broadcast in the first preferred channel, the user may move the channel indicator 420 upwards on the channel scroll bar 410. Here, the user may locate the channel indicator 420 to a point corresponding to the first preferred channel, by using the channel-up key of the control device 300.

The image display apparatus 100 may move the channel indicator 420 on the channel scroll bar 410 by a predetermined distance, based on a user's input. For example, the image display apparatus 100 may move the channel indicator 420 to a point which is adjacent in an upward direction to a point at which the channel indicator 420 is currently located, from among the plurality of points of the channel scroll bar 410. Also, a time that is taken for the channel indicator 420 to move from the start point to the end point from among the plurality of points, may be identical, irrespective of the total number of channels stored in the image display apparatus 100.

Also, the image display apparatus 100 may change the channel information 430 displayed on the display while the channel indicator 420 moves on the channel scroll bar 410. For example, whenever the channel indicator 420 moves to an adjacent point, the image display apparatus 100 may change the channel number continually to the next channel number or the previous channel number.

Figure 6D:
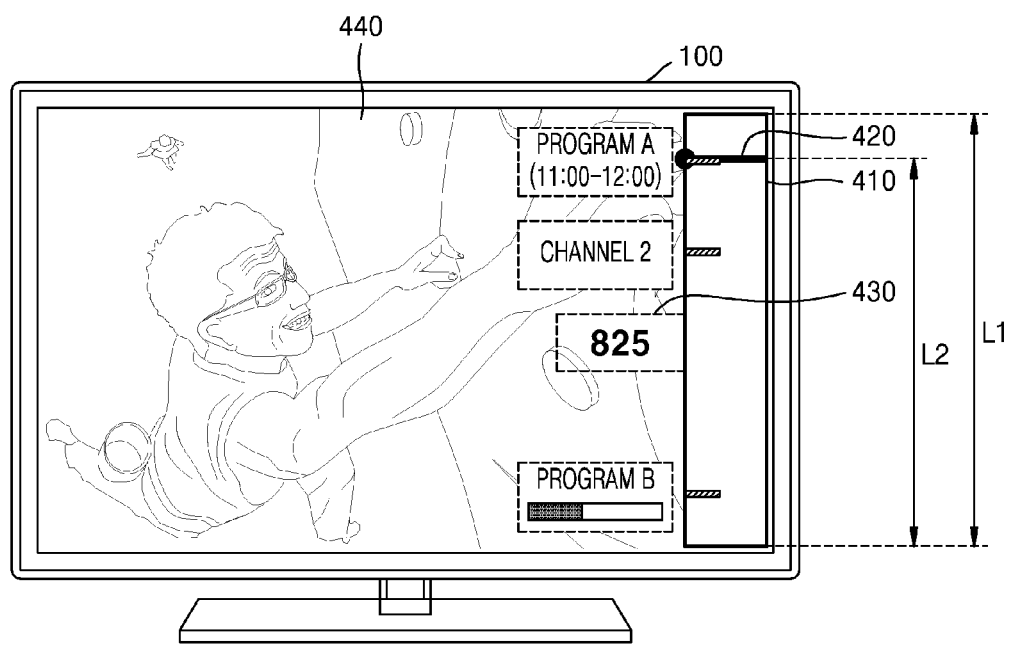
Figure 6D:
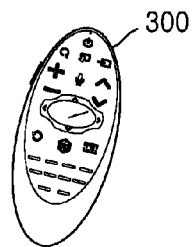

The image display apparatus 100 may change the channel number in an order of 376, 377, . . . , 824, 825, as the channel indicator 420 moves upwards, as illustrated in FIG. 6D. Also, when the channel indicator 420 is located at a point of the channel scroll bar 410, which corresponds to the first preferred channel, from among the plurality of points of the channel scroll bar 410, the image display apparatus 100 may display '825,' which is the channel number of the first preferred channel. Here, L2 (the distance between the start point of the channel scroll bar 410 and the point at which the channel indicator 420 is currently located)/L1 (the total size of the channel scroll bar 410) may be 0.825.

Meanwhile, when the channel indicator 420 moves on the channel scroll bar 410, the image display apparatus 100 may not change a channel screen displayed on the display. For example, referring to FIGS. 6C and 6D, while the channel number is changed from 375 to 825, the image display apparatus 100 may continually display an image 440 corresponding to channel 375. However, the present disclosure is not limited thereto.

Meanwhile, a signal of a long press input of the channel-up key according to an embodiment may include a continual plurality of pressed key signals, and the long press input of the channel-up key may continually generate a channel-up command.

As described with reference to FIG. 6B, the image display apparatus 100 may convert the present channel to the next channel in response to a first pressed key signal from among the plurality of pressed key signals. Also, in response to pressed key signals after a second pressed key signal from among the plurality of pressed key signals, the image display apparatus 100 may move the channel indicator 420 on the channel scroll bar 410 and may only change the channel information 430 as the next channel information 430 while not changing the channel, as illustrated in FIGS. 6C and 6D.

When a channel-up command or a channel-down command is not received, the image display apparatus 100 according to an embodiment may stop moving the channel indicator 420 and convert the channel to a channel corresponding to the point of the channel scroll bar 410, at which the channel indicator 420 is located. For example, the image display apparatus 100 may receive from the control device 300 a signal of an input of releasing the long pressed channel-up key or channel-down key. When the input of releasing the long pressed channel-up key or channel-down key is received, the image display apparatus 100 may convert the present channel to the channel corresponding to the point of the channel scroll bar 410, at which the channel indicator 420 is located. For example, at a point of time at which the input of releasing the long pressed channel-up key or channel-down key is received, the image display apparatus 100 may determine the point of the channel scroll bar 410, at which the channel indicator 420 is located, and may convert the present channel to the channel corresponding to the point of the channel scroll bar 410, at which the channel indicator 420 is located.

Figure 6E:
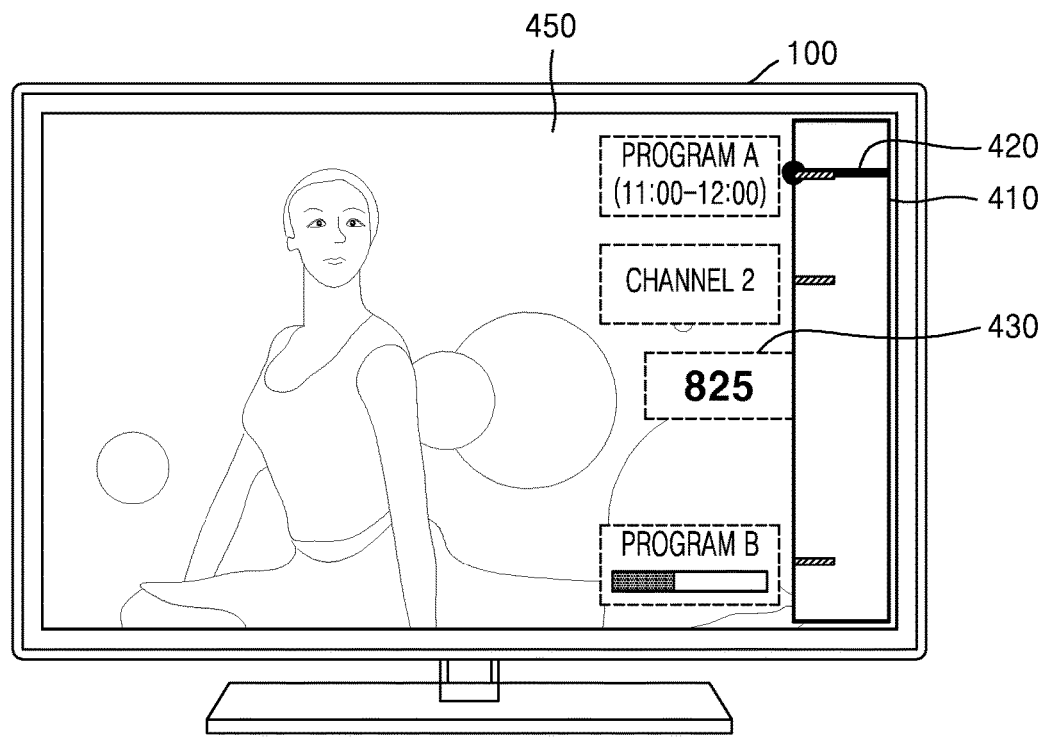
Figure 6E:
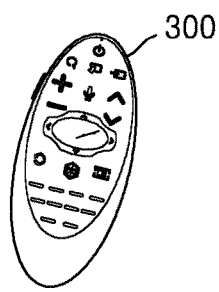

For example, as illustrated in FIG. 6E, when the channel indicator 420 is located at a point of the channel scroll bar 410, which corresponds to the first preferred channel, at the point of time at which the input of releasing the long pressed channel-up key or channel-down key is received, the image display apparatus 100 may convert the present channel (for example, channel 375) to the first preferred channel (channel 825). The image display apparatus 100 may receive a broadcasting signal corresponding to the first preferred channel and display an image 450 corresponding to the first preferred channel on the display.

When an input of the key is not received for a predetermined period of time after the channel conversion, the image display apparatus 100 may end the display of the channel scroll bar 410 and the channel indicator 420.

As described with reference to FIGS. 6A through 6E, the image display apparatus 100 according to an embodiment may display points of the channel scroll bar 410, which correspond to preferred channels, and the channel information with respect to the preferred channels. Accordingly, the user may easily identify a point of the channel scroll bar 410, which corresponds to a channel that the user wishes to view, and may move the channel indicator 420 to the point to convert a present channel to the channel that the user wishes to view.

Figure 7A:
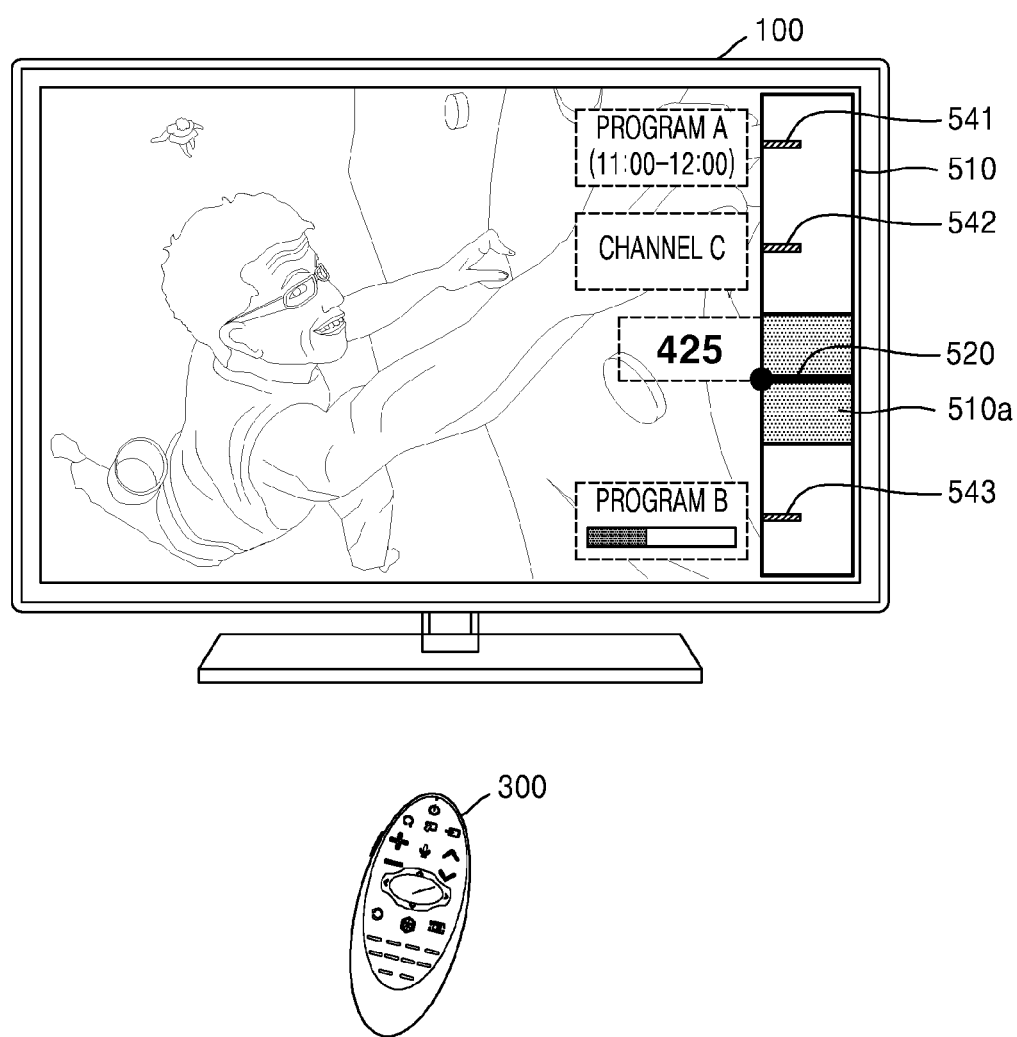
FIGS. 7A and 7B are diagrams illustrating an example speed at which a channel indicator moves on a channel scroll bar, according to an example embodiment.
Figure 7B:
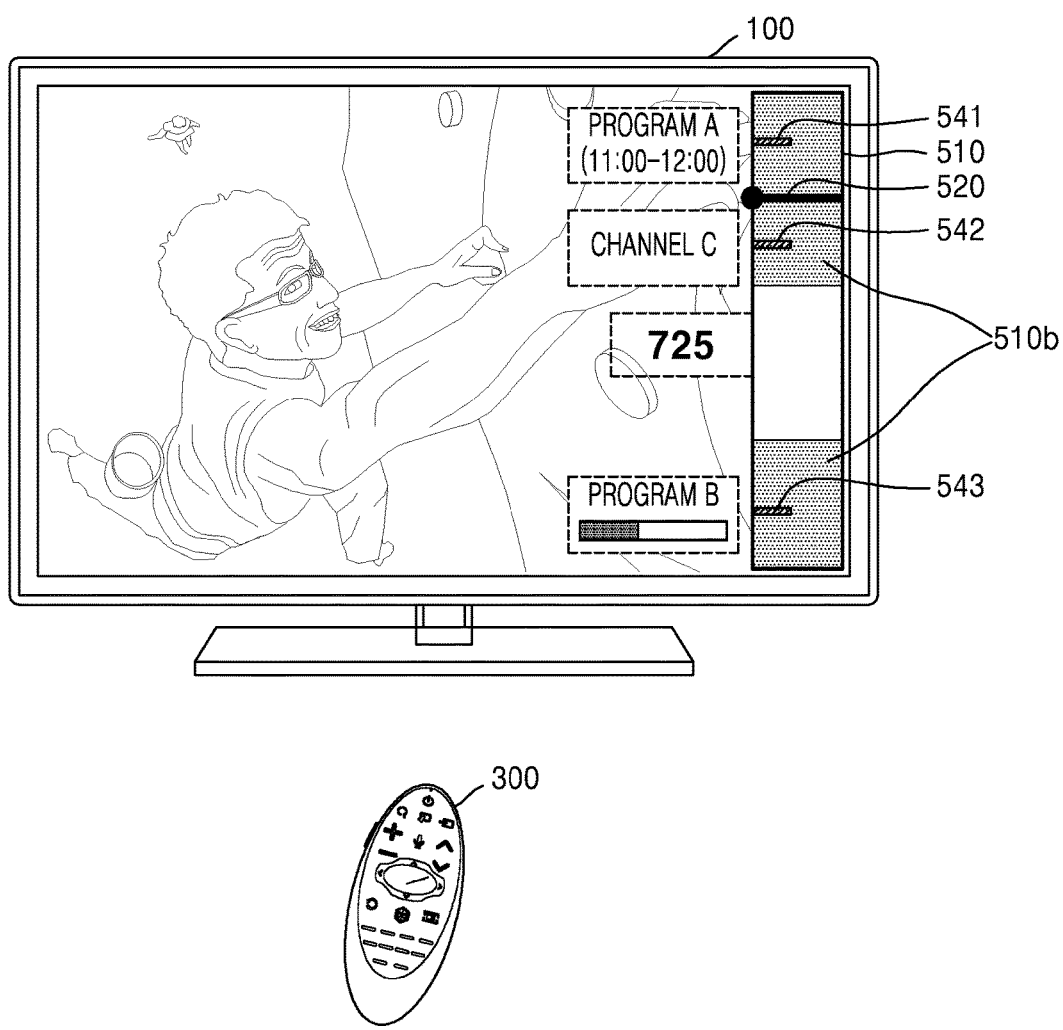

FIGS. 7A and 7B are diagrams illustrating an example speed at which a channel indicator 520 moves on a channel scroll bar 510, according to an example embodiment.

Referring to FIG. 7A, the image display apparatus 100 according to an embodiment may display the channel scroll bar 510 and the channel indicator 520, when the image display apparatus 100 continually receives a channel-up command or a channel-down command from the control device 300. However, the present disclosure is not limited thereto. Here, a point corresponding to a preferred channel may be indicated on the channel scroll bar 510. The preferred channel according to an embodiment may be determined by using the method described with reference to FIG. 5. For example, the image display apparatus 100 may determine a first channel, a second channel, and a third channel as the preferred channel. Here, as illustrated in FIG. 7A, specific objects 541, 542, and 543 may be indicated on points of the channel scroll bar 510, which correspond to the first channel, the second channel, and the third channel.

Referring to FIGS. 7A and 7B, the image display apparatus 100 according to an embodiment may slowly move the channel indicator 520 in an area including the point corresponding to the preferred channel, and may quickly move the channel indicator 520 in an area not including the point corresponding to the preferred channel.

For example, as illustrated in FIG. 7A, the image display apparatus 100 may move the channel indicator 520 at a first speed in a first area 510a not including the points corresponding to the first channel, the second channel, and the third channel. Also, as illustrated in FIG. 7B, the image display apparatus 100 may move the channel indicator 520 at a second speed that is less than the first speed, in a second area 510b including the points corresponding to the first channel, the second channel, and the third channel.

Meanwhile, sizes of the first area 510a and the second area 510b may be set to vary, and the speed at which the channel indicator 520 moves in the first area 510a and the speed at which the channel indicator 520 moves in the second area 510b may be set based on the sizes of the first area 510a and the second area 510b. Also, a time required for the channel indicator 520 to move through the whole channel scroll bar 510 may be constant regardless of the number of preferred channels, and the sizes of the first area 510a and the second area 510b.

Figure 8:
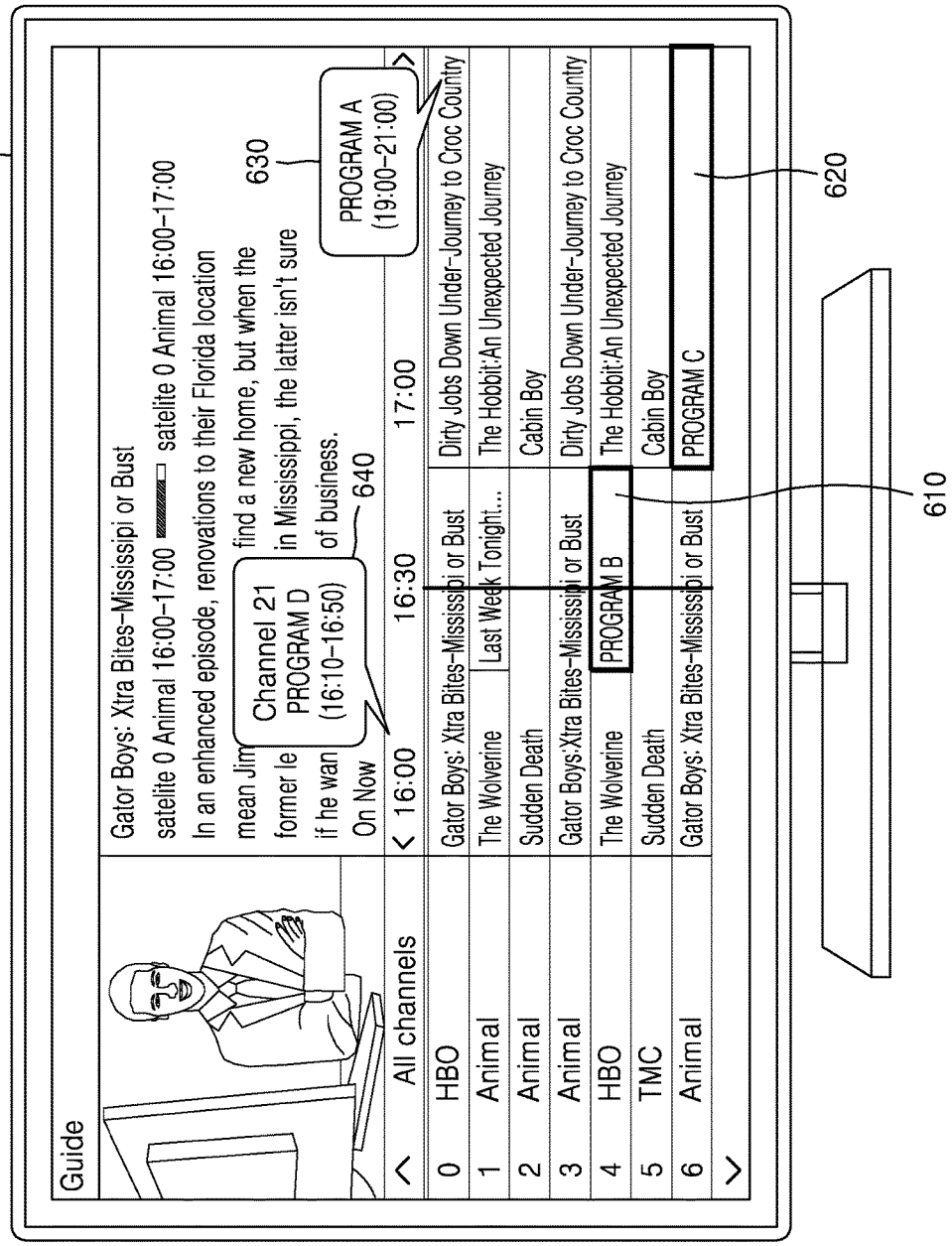
FIG. 8 is a diagram illustrating an example electronic program guide (EPG) screen displayed on an image display apparatus, according to an example embodiment.

FIG. 8 is a diagram illustrating an example EPG screen displayed on the image display apparatus 100 according to an example embodiment.

Referring to FIG. 8, the image display apparatus 100 may display information with respect to at least one service provided by the image display apparatus 100 as an EPG. For example, the EPG may include a broadcasting channel providing a program, information with respect to a program provider, program information, schedule information of the program (start time and end time information of the program), or the like.

The image display apparatus 100 may display a determined preferred channel or preferred program on the EPG, based on a search history of a keyword of a user. For example, the image display apparatus 100 may count the number of times in which each keyword is searched for a predetermined period of time, and when the number of times in which the keyword is searched is equal to or greater than a predetermined number of times, the image display apparatus 100 may determine a program corresponding to the keyword as the preferred program.

Also, the image display apparatus 100 may determine the preferred program by differently applying a weight to a frequency at which the keyword is searched, based on a method of inputting the keyword. For example, the image display apparatus 100 may apply a greater weight to the keyword searched via sound than the keyword searched via text.

The image display apparatus 100 may determine a priority order of programs corresponding to keywords, based on frequencies at which the keywords are searched. Here, the priority order of the programs may increase as the frequencies at which the keywords corresponding thereto are searched increase. The image display apparatus 100 may determine only a predetermined number of programs having high priority orders as the preferred program. However, the present disclosure is not limited thereto.

The image display apparatus 100 according to an embodiment may display the determined preferred program on the EPG. The image display apparatus 100 may display an area of the EPG, the area corresponding to the preferred program, by highlighting the area. For example, as illustrated in FIG. 8, the image display apparatus 100 may display a first area 610 corresponding to program B and a second area 620 corresponding to program C by highlighting the areas 610 and 620.

Alternatively, when an area corresponding to the preferred program is not displayed on a current EPG screen, the image display apparatus 100 may display information with respect to the program via a pop-up window. For example, as illustrated in FIG. 8, the image display apparatus 100 may display information with respect to program A via a pop-up window 630, when program A is the preferred program which is broadcast from 19:00 to 21:00, and is not displayed on the current EPG screen. Alternatively, when program D is the preferred program which is broadcast on channel 21, and is not displayed on the current EPG screen, the image display apparatus 100 may display information with respect to program D via a pop-up window 640. However, the present disclosure is not limited thereto.

Figure 9:
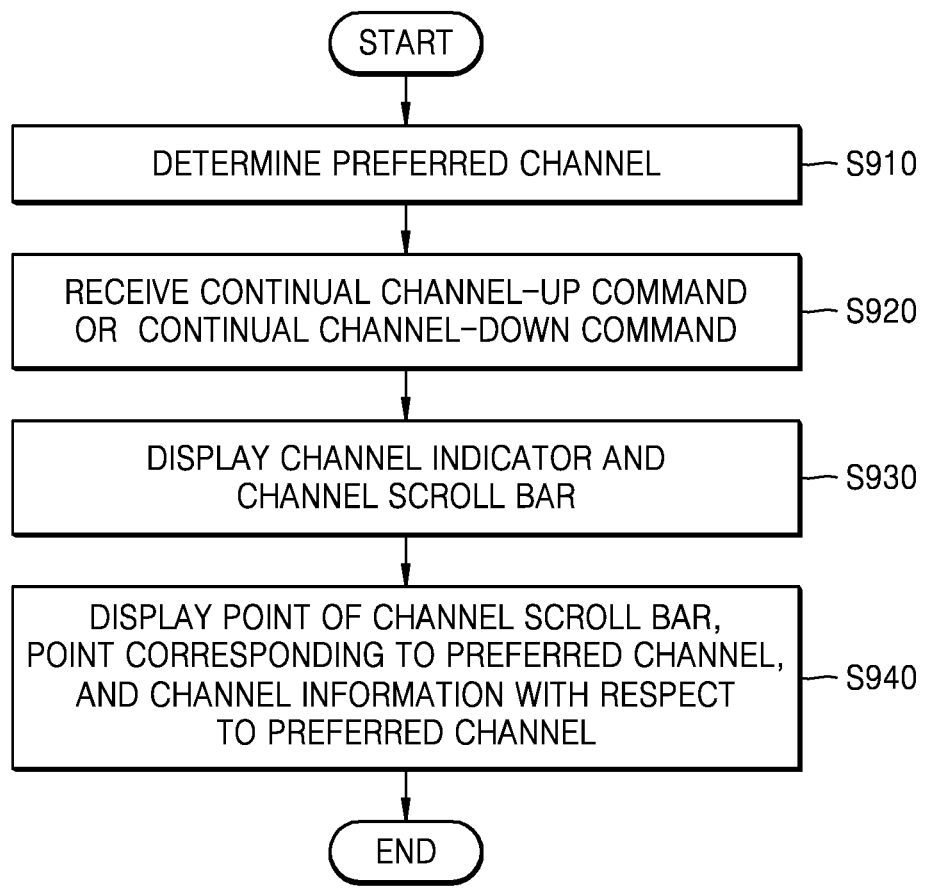
FIG. 9 is a flowchart illustrating an example method of operating an image display apparatus, according to an example embodiment.

FIG. 9 is a flowchart illustrating an example method of operating the image display apparatus 100 according to an example embodiment.

Referring to FIG. 9, the image display apparatus 100 according to an embodiment may determine a preferred channel based on a search history of a keyword in operation S910.

For example, the image display apparatus 100 may determine a channel corresponding to a keyword as the preferred channel, based on a frequency at which the keyword is searched. The image display apparatus 100 may count the number of times in which each keyword is searched for a predetermined period of time, and when the number of times in which a keyword is searched is equal to or greater than a predetermined number of times, may determine a channel corresponding to the keyword as the preferred channel. Also, the image display apparatus 100 may differently apply a weight to the frequency at which the keyword is searched, based on a type of the keyword or a method of inputting the keyword. However, the present disclosure is not limited thereto.

When the image display apparatus 100 continually receives a channel-up or a channel-down command in operation S920, the image display apparatus 100 may display the channel indicator 420 and the channel scroll bar 410 in operation S930.

For example, when the image display apparatus 100 receives a signal of a long press input of a channel-up key or a long press input of a channel-down key from the control device 300, the image display apparatus 100 may display the channel scroll bar 410 including a plurality of points to which the channel indicator 420 may move. The plurality of points may correspond to a plurality of channels stored in the image display apparatus 100, respectively.

The image display apparatus 100 may display a point corresponding to the preferred channel from among the plurality of points of the channel scroll bar and channel information with respect to the preferred channel in operation S940.

For example, the image display apparatus 100 may display an object at the point corresponding to the preferred channel and display the channel information with respect to the preferred channel. The channel information with respect to the preferred channel may include a channel title of the preferred channel, a channel number of the preferred channel, a broadcasting company, a content title content (a program) provided by the preferred channel, schedule information of the content (start time and end time of the content), etc. However, the present disclosure is not limited thereto.

As described above, according to the one or more of the above example embodiments, the image display apparatus may display the preferred channel of a user on the channel scroll bar so that the user may easily search for a desired channel.

The operating method of the image display apparatus according to an embodiment may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the present disclosure or may be known to and usable by one of ordinary skill in a field of computer software. Examples of the non-transitory computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level programming language that may be executed by a computer using an interpreter as well as a machine language code made by a complier.

It should be understood that the various example embodiments described herein should be considered in a descriptive sense only and not for purposes of limitation. Descriptions of features or aspects within each example embodiment should typically be considered as available for other similar features or aspects in other example embodiments.

While various example embodiments have been described with reference to the figures, it will be understood by those of ordinary skill in the art that various changes in form and details may be made therein without departing from the spirit and scope as defined by the following claims and their equivalents.

What is claimed is:

1. An image display apparatus comprising:
a display;
a memory configured to store channel information corresponding to at least one channel; and
a processor configured to execute one or more instructions stored in the memory,
wherein the instructions, when executed by the processor, cause the image display apparatus to:
determine a preferred channel by applying a first weight when a keyword is input via text and applying a second weight which is greater than the first weight when the keyword is input via voice,
display, on the display, when a continual channel-up command or a continual channel-down command is received, a channel scroll bar representing the stored channel information including a channel indicator configured to move along the channel scroll bar according to the continual channel-up command or the continual channel-down command, and a preferred channel indicator indicating a position of the preferred channel in the channel scroll bar, and
to display channel information for the preferred channel, at a position of the preferred channel indicator, corresponding to the at least one preferred channel.

2. The image display apparatus of claim 1, further comprising:
a sound receiver comprising sound receiving circuitry configured to receive voice input,
wherein the instructions, when executed by the processor, cause the image display apparatus to extract the keyword from the voice input received by the sound receiver.

3. The image display apparatus of claim 1, wherein the keyword comprises at least one of: a channel title, a channel number, a name of a broadcasting company, and a content title, and
the instructions, when executed by the processor, cause the image display device to determine at least one of a channel corresponding to at least one of: the channel title, the channel number, and the name of the broadcasting company and a channel providing content corresponding to the content title, as the preferred channel.

4. The image display apparatus of claim 1, wherein the instructions, when executed by the processor, cause the image display apparatus to determine the preferred channel by applying a first weight when the keyword is input via text and applying a second weight which is greater than the first weight when the keyword is input via voice.

5. The image display apparatus of claim 1, wherein the instructions, when executed by the processor, cause the image display apparatus to:
determine the at least one preferred channel based on a frequency at which the keyword is searched; and
determine the preferred channel, by applying a weight to the frequency at which the keyword is searched, based on at least one of: a type of a method of inputting the keyword.

6. The image display apparatus of claim 1, wherein the channel information of the preferred channel comprises at least one of: channel titles of the preferred channel, channel numbers of the preferred channel, names of broadcasting companies providing the preferred channel, content titles of pieces of content provided by the preferred channel and related to the searched keyword, and schedule information of the pieces of content.

7. The image display apparatus of claim 1, wherein the instructions, when executed by the processor, cause the image display apparatus to:
move the channel indicator on the channel scroll bar in a first direction or a second direction, in response to the continual channel-up command or the continual channel-down command, and
control the display to display channel information with respect to a channel corresponding to a position of the channel scroll bar, at which the channel indicator is located.

8. The image display apparatus of claim 1, further comprising:
a sensor configured to sense a first input corresponding to a long press of a channel-up key or a channel-down key and a second input corresponding to a release of the channel-up key or the channel-down key,
wherein the instructions, when executed by the processor, cause the image display apparatus to:
move the channel indicator on the channel scroll bar in a first direction or a second direction and control the display to display channel information of a channel corresponding to a position of the channel scroll bar, at which the channel indicator is located, in response to the first input, and
change a present channel to the channel corresponding to the position of the channel scroll bar, at which the channel indicator is located, and display an image corresponding to the changed channel, in response to the second input.

9. The image display apparatus of claim 4, wherein the instructions, when executed by the processor, cause the image display device to:
determine a priority order of channels corresponding to the keyword, based on the frequency at which the keyword is searched, and
determine a predetermined number of channels having high priority orders as the preferred channel.

10. The image display apparatus of claim 5, wherein the instructions, when executed by the processor, cause the image display apparatus to determine the preferred channel, by applying a greater weight to the frequency at which a keyword indicating content is searched than the frequency at which a keyword indicating a channel is searched, and by applying a greater weight to the frequency at which a keyword input via voice is searched than the frequency at which a keyword input via text is searched.

11. A method of operating an image display apparatus, the method comprising:
   determining a preferred channel by applying a first weight when a keyword is input via text and applying a second weight which is greater than the first weight when the keyword is input via voice;
   receiving a continual channel-up command or a continual channel-down command;
   displaying, in response to the continual channel-up command or the continual channel-down command, a channel scroll bar representing the stored channel information including a channel indicator which moves along the channel scroll bar according to the continual channel-up command or the continual channel-down command, and a preferred channel indicator in the channel scroll bar for indicating a position of the preferred channel in the channel scroll bar, on a display; and
   displaying channel information for the preferred channel, at a position of the preferred channel indicator corresponding to the preferred channel.

12. The method of claim 11, further comprising:
   receiving a voice; and
   extracting the keyword from the received voice.

13. The method of claim 11, wherein the keyword comprises at least one of: a channel title, a channel number, a name of a broadcasting company, and a content title, and
   the determining of the preferred channel comprises determining at least one of a channel corresponding to at least one of: the channel title, the channel number, and the name of the broadcasting company and a channel providing content corresponding to the content title, as the preferred channel.

14. The method of claim 11, wherein the determining of the preferred channel comprises determining the preferred channel by applying a first weight when the keyword is input via text and applying a second weight which is greater than the first weight when the keyword is input via sound.

15. The method of claim 11, wherein the determining of the preferred channel comprises determining the preferred channel, by applying a weight to a frequency at which the keyword is searched, based on at least one of a type of the keyword and a method of inputting the keyword.

16. The method of claim 11, wherein the determining of the preferred channel comprises determining the preferred channel, by applying a greater weight to the frequency at which a keyword indicating content is searched than the frequency at which a keyword indicating a channel is searched, and by applying a greater weight to the frequency at which a keyword input via voice is searched than the frequency at which a keyword input via text is searched.

17. The method of claim 11, wherein the channel information with respect to the preferred channel comprises at least one of: channel titles of the preferred channel, channel numbers of the preferred channel, names of broadcasting companies providing the preferred channel, content titles of pieces of content provided by the preferred channel and related to the searched keyword, and schedule information of the pieces of content.

18. The method of claim 11, further comprising:
   sensing a first input comprising a long press of a channel-up key or a channel-down key;
   moving the channel indicator on the channel scroll bar in a first direction and/or a second direction and displaying channel information with respect to a channel corresponding to a position of the channel scroll bar, at which the channel indicator is located, in response to the first input;
   sensing a second input that releases the channel-up key or the channel-down key; and
   changing a present channel to the channel corresponding to the position of the channel scroll bar, at which the channel indicator is located, and displaying an image corresponding to the changed channel, in response to the second input.

19. A non-transitory computer-readable recording medium having recorded thereon a program for executing the method of any of claim 11.

20. The method of claim 14, wherein the determining of the preferred channel comprises determining a priority order of channels corresponding to the keyword, based on the frequency at which the keyword is searched, and determining a predetermined number of channels having high priority orders as the preferred channel.

* * * * *